US007121359B2

(12) United States Patent
Frauhammer et al.

(10) Patent No.: US 7,121,359 B2
(45) Date of Patent: Oct. 17, 2006

(54) DRILLING HAMMER HAVING AN EXTERNAL MECHANISM FOR SELECTIVELY SWITCHING OPERATION BETWEEN IMPACT DRILLING AND CHISELING MODES

(75) Inventors: Karl Frauhammer, Leinfelden-Echterdingen (DE); Gerhard Meixner, Filderstadt (DE); Heinz Schnerring, Dettenhausen (DE); Willy Braun, Neustetten (DE); Axel Kuhnle, Freiberg A. N. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/523,852

(22) PCT Filed: Jul. 25, 2003

(86) PCT No.: PCT/DE03/02512

§ 371 (c)(1), (2), (4) Date: Feb. 7, 2005

(87) PCT Pub. No.: WO2004/060616

PCT Pub. Date: Jul. 22, 2004

(65) Prior Publication Data

US 2005/0269116 A1 Dec. 8, 2005

(30) Foreign Application Priority Data

Dec. 24, 2002 (DE) ................................ 102 61 030

(51) Int. Cl.
*B23B 45/02* (2006.01)

(52) U.S. Cl. .......................... 173/48; 173/104; 173/91; 173/216

(58) Field of Classification Search .................. 173/48, 173/104, 93, 93.5, 216, 205, 109, 112, 178, 173/91
See application file for complete search history.

(56) References Cited

U.S. PATENT DOCUMENTS 4,236,588 A 12/1980 Moeldan et al.
(Continued)

FOREIGN PATENT DOCUMENTS

DE 38 26 213 A1 2/1990
(Continued)

*Primary Examiner*—Louis K. Huynh
*Assistant Examiner*—Brian Nash
(74) *Attorney, Agent, or Firm*—Michael J. Striker

(57) ABSTRACT

The present invention relates to a drilling hammer comprising a hammer tube (13) that is rotationally drivable inside a housing (10), a striking tool (14) located in the hammer tube (13) and provided with a piston (15) that can driven with a reciprocating motion, and an operating mode change-over switch (35) for the "impact drilling" and "chiseling" operating modes. The hammer tube (13) is decoupled from its rotary drive when in the "impact drilling" operating mode and is secured in the housing (10) in a non-rotative manner when in the "chiseling" operating mode. To obtain a switching mechanism (37) of the operating mode change-over switch (35) having a very flat design and requiring little installation space, an actuator ring (48) is fixed on the hammer tube (13) in an axially displaceable and torsion-proof manner, the actuator ring including at least one radially projecting locking spline (51) on its outer side facing away from the hammer tube (13), the locking spline being capable of engaging in at least one axial recess (52) in the gearbox and in locking toothing (53) in the housing. Rotational motion of a control button (36) of the operating mode change-over switch (35) is converted to axial displacement of the actuator ring (48) on the hammer tube (13) by the switching mechanism (37). In addition, the operating mode change-over switch (35) can be used to activate a "drilling" operating mode, in which the striking tool (14) is decoupled on the drive side.

14 Claims, 4 Drawing Sheets

U.S. PATENT DOCUMENTS 4,763,733 A * 8/1988 Neumaier .................... 173/48
5,111,890 A 5/1992 Ranger et al.
6,176,321 B1 1/2001 Arakawa et al.
6,609,577 B1 * 8/2003 Beccu ........................ 173/93.6
6,675,908 B1 * 1/2004 Frauhammer et al. ........ 173/48
6,691,796 B1 * 2/2004 Wu ............................. 173/48
6,712,156 B1 * 3/2004 Funfer ......................... 173/48
6,913,090 B1 * 7/2005 Droste et al. ............... 173/109
6,938,705 B1 * 9/2005 Kikuchi ...................... 173/201
2005/0028995 A1 * 2/2005 Saito et al. ................. 173/176

FOREIGN PATENT DOCUMENTS

EP 0 884 138 A2 12/1998
GB 2115337 A * 9/1983
GB 2 324 491 A 10/1998
GB 2 371 008 A 7/2002

* cited by examiner

DRILLING HAMMER HAVING AN EXTERNAL MECHANISM FOR SELECTIVELY SWITCHING OPERATION BETWEEN IMPACT DRILLING AND CHISELING MODES

CROSS-REFERENCE

The invention described and claimed hereinbelow is also described in PCT/DE 03/02512, filed on Jul. 25, 2003 and DE 102 61 030.4, filed Dec. 24, 2002. This German Patent Application, whose subject matter is incorporated here by reference, provides the basis for a claim of priority of invention under 35 U.S.C. 119(a)–(d).

BACKGROUND OF THE INVENTION

The present Invention is directed to a drilling hammer.

It is commonplace today to equip drilling hammers having a certain rating such that they can be used in the "impact or hammer drilling" operating mode, in which the striking tool hammers the work piece in the axial direction while the tool is simultaneously started rotating using the tool holder, and they can be used in the "chiseling" operating mode, in which only the striking tool is activated and the rotational drive for the tool holder is turned off. Since a single electric motor drives, via a gear unit, a hammer tube that is connected with the tool holder in a torsion-proof manner, and it drives the striking tool via a crank driving mechanism, the piston of which makes a reciprocating stroking motion in the hammer tube and acts on a beater which, in turn, transfers the impacts to the end of the tool via a snap die, an operating mode change-over switch is provided that separates the hammer tube from the gear unit in the "chiseling" operating mode and secures it against rotation in the housing. In this mode, the rotatably supported driven gear of the gear unit encompassing the hammer tube is separated from the hammer tube.

SUMMARY OF THE INVENTION

The drilling hammer according to the present invention has the advantage that the switching mechanism of the operating mode change-over switch is very flat in design and the axial extension of the operating mode change-over switch can be kept small due in particular to a narrow actuator ring. The flat design allows the housing cover on which the manually operated control button is mounted to have a low profile and the width across corners of the drilling hammer, i.e., the distance between the center of the switching mechanism and the upper edge of the housing, to be kept small. A single locking spline is sufficient to establish a torsion-proof connection between the actuator ring fixed on the hammer tube in a torsion-proof and axially displaceable manner and the driven wheel of the gear unit. Preferably, a large number of locking splines distributed around the circumference of the actuator ring is provided, the locking splines being axially insertable into a correspondingly large number of axial recesses in the driven wheel. As a result of the large number of locking splines and axial recesses, the actuator ring—which is made of metal—can transfer higher torque, and may also be made of plastic. In addition, given the non-aligning orientation of locking splines and axial recesses, a very small path of rotation of the hammer tube is required to snap the actuator ring into the drive wheel. If the guide splines on the actuator ring provided for a torsion-proof connection and guide grooves in the hammer tube are equidistant, the actuator ring can be slid onto the hammer tube in any relative position, which makes installation easier. The switching mechanism can be designed to be very compact and stable despite the small overall size, thereby ensuring a long service interval.

According to an advantageous embodiment of the present invention, the actuator ring is located on the side of the driven wheel facing away from the control button and is connected in a fixed manner—underneath the drive wheel and past it—with a coupling ring slid onto the hammer tube on the other side of the driven wheel, the coupling ring being coupled to the control button such that switching the control button brings about an axial displacement of the actuator ring. Due to this structural design, the switching mechanism on the hammer tube is located under the driven wheel of the gear unit so that the width across corners of the drilling hammer is determined only by the outer diameter of the driven wheel—which is typically designed as a ring gear—and is minimized by it.

According to an advantageous embodiment of the present invention, the connection with the coupling ring, which is preferably made of plastic, is realized using two cantilevers, which extend integrally with the coupling ring axially away from said coupling ring and accommodate the actuator ring in recesses located near its ends. The actuator ring can be installed easily by pressing the two elastically outwardly preloaded cantilevers together. The circumferential play of the cantilevers is kept greater than that of the actuator ring on the hammer tube, so that the cantilevers need not transfer any torque.

According to an advantageous embodiment of the present invention, the coupling ring is coupled to the control button via a shift fork that is guided with a projection in an annular groove in the coupling ring, whereby the coupling takes place via a synchronizing spring retained on the shift fork and an eccentric pin located on the control button, on which said eccentric pin the legs of the shifter fork bear in a non-positive manner at diametral points. The large synchronizing spring allows the operating mode change-over switch to be changed over easily and reliably. The shift fork and the coupling ring can be fabricated economically out of plastic. The size of the control button makes operation easier and also permits handling using work gloves.

According to an advantageous embodiment of the present invention, a further setting position for the "drilling" operating mode is assigned to the control button; in this mode, the striking tool is decoupled from its drive when the hammer tube rotates. This decoupling is not brought about by the axial displacement of the actuator ring on the hammer tube, but rather by the displacement—at a right angle thereto—of a switching mechanism part that separates a coupling located in the drive chain of the striking tool. To this end, a switching ramp which extends across an angle of rotation is configured on the control button, preferably on its underside, the switching ramp rising in the direction of the axis of rotation of the control button. The switching mechanism part is preferably configured as an axially displaceable separating slide, which bears against the switching ramp in a non-positive manner and against a displaceable coupling part of the coupling that, when displaced axially against the force of a coupling spring, the coupling can be released. The low spring force of the coupling spring and a spring provided on the separating slide for bearing against the switching ramp in a non-positive manner permits the operating mode change-over switch to be operated in an easy yet reliable manner.

BRIEF DESCRIPTION OF THE DRAWINGS

The present invention is explained in greater detail in the description below with reference to an exemplary embodiment presented in the drawing.

DETAILED DESCRIPTION OF THE PREFERRED EMBODIMENTS

Figure 1:
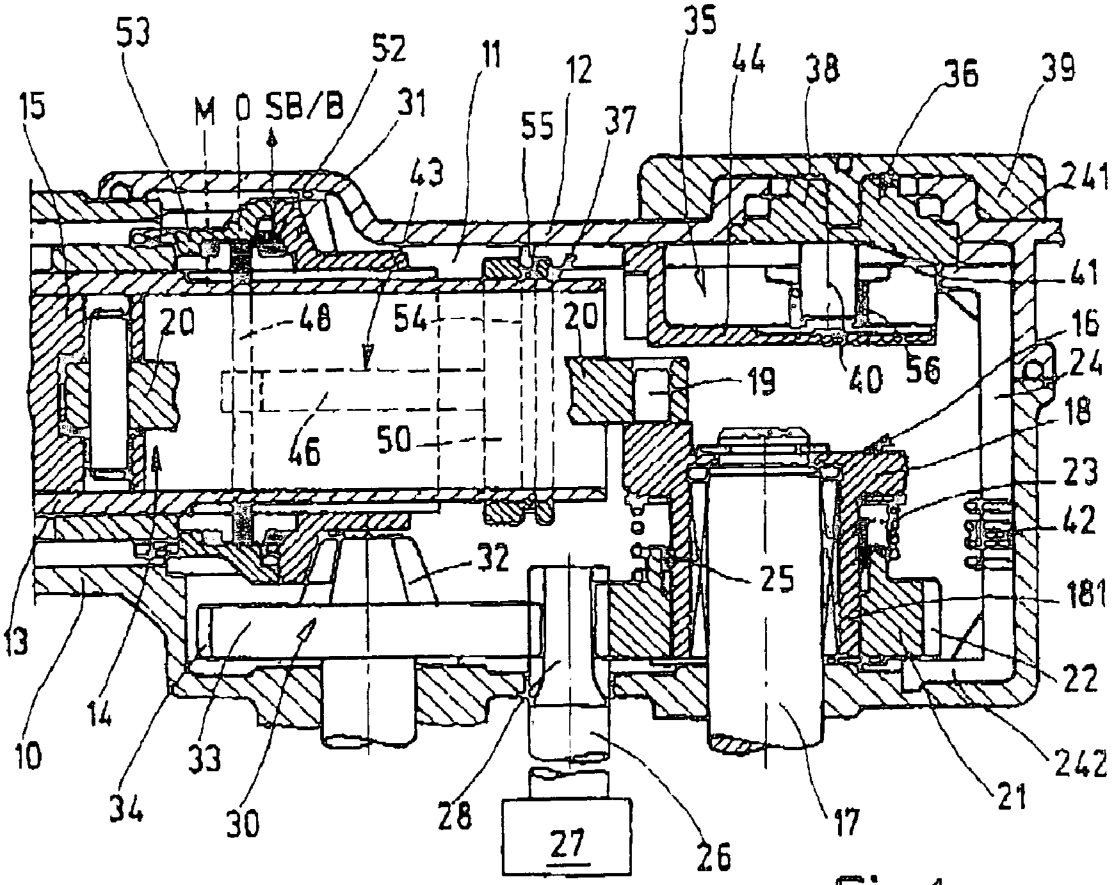
FIG. 1 shows, in sections, a longitudinal sectional view of a drilling hammer with an operating mode change-over switch.

The drilling hammer shown in a sectional view in FIG. 1 with its rear region in a longitudinal sectional view includes a housing 10 with a housing opening 11 that is closed by a housing cover 12. A tool holder extends out of housing 10 at its left end, which is not shown in FIG. 1, on which a tool is mounted in a limited axially displaceable manner. The tool holder is connected in a torsion-proof manner with a hammer tube 13 rotatably supported in housing 10. An air cushion striking tool 14 with a piston 15 capable of being displaced axially in hammer tube 13 is located in hammer tube; the air cushion striking tool can be brought into reciprocating motion using a crank driving mechanism 16 located in a drive chain between an electric motor 27 and piston 15. Air cushion striking tool 14 further includes a beater driven by piston 15, the beater acting via a snap die on the end of the tool mounted in the tool holder. To this extent, the drilling hammer described here conforms with the drilling hammer described in DE 38 26 213 A1, whereby the arrangement and configuration of the tool holder, hammer tube 13 and air cushion striking tool 14 with piston 15 described there also apply to the drilling hammer described here.

Crank driving mechanism 16 includes a crank wheel 18 with an integral bearing tube 181 and a crank pin 19 positioned eccentrically to the axis of rotation, on which a push rod 20 bears in a rotatable manner, the push rod being connected with piston 15 of air cushion striking tool 14 in a swivelling manner. Crank wheel 18 is supported In a rotational manner with its bearing tube 181 on an axis 17 in the housing. A gear wheel 21 with external teeth 22 is situated on bearing tube 181 In a rotatable and axially displaceable manner. A coupling spring 23 configured as a coil compression spring bears between crank wheel 18 and gear wheel 21, the coupling spring pressing gear wheel 21 on the front side against a separating slide 24 described in detail hereinbelow. In this displacement position of gear wheel 21 shown in F*ig*. 1, a torsion-proof connection between crank wheel 18 and gear wheel 21 IS established via a tooth system 25 between gear wheel 21 and bearing tube 181 of crank wheel 18: the torsion-proof connection can be released by sliding gear wheel 21 in FIG. 1 upward. A coupling is therefore located in the drive chain, one coupling part of which is formed by crank wheel 18 with bearing tube 181; the other coupling part, which can be actuated by separating lever 24, is formed by gear wheel 21. The coupling is held closed by coupling spring 23. Gear wheel 21 meshes with its outer teeth 22 with a drive pinion 28 formed on a driven shaft 26 of electric motor 27. It should be noted that, in FIG. 1, crank driving mechanism 16 is shown in a position in which piston 15 assumes its anterior dead-center position, shown at the left in FIG. 1. To ensure clarity in the drawing, piston 15 is shown further to the left than it would be under actual circumstances, however.

Hammer tube 13, which is rotatably supported in housing 10, is started rotating by electric motor 27 via a gear unit 30, so that the tool, which is axially displaceable with limitation in the tool holder and is mounted in a non-rotative manner, also rotates. Gear unit 30 includes a ring gear located on hammer tube 13, the ring gear being retained on hammer tube 13 in an axially displaceable and rotatable manner, a bevel gear 32 meshing with teeth on ring gear 31, and a gear wheel 33 with external teeth 34 that is connected with bevel gear 32 in torsion-proof fashion. Bevel gear 32 and gear wheel 33 are rotatably retained in housing 10, and external teeth 34 mesh with drive pinion 28 on driven shaft 26 of electric motor 27.

The drilling hammer described in this manner can be used in three operating modes. In the "impact drilling" operating mode, electric motor 27, which has been turned on, brings hammer tube 13 into rotation and activates air cushion striking tool 14; for this purpose, the coupling in the drive chain of air cushion striking tool 14 (as shown in FIG. 1) is closed and ring gear 31 is connected with hammer tube 13 in a torsion-proof manner. In the "chiseling" operating mode, only the air cushion striking tool 14 is activated; for this purpose, the coupling in the drive chain of air cushion striking tool 14 is closed and ring gear 31 is decoupled from hammer tube 13. In the "drilling" operating mode, air cushion striking tool 14 is idled and hammer tube 13 is started rotating; for this purpose, the coupling in the drive chain of air cushion striking tool 14 is opened and ring gear 31 is connected with hammer tube 13 in a torsion-proof manner.

An operating mode change-over switch 35 serves to set these three different operating modes of the drilling hammer, the operating mode change-over switch including a single, manually operated control button 36 and a switching mechanism 37 having a stable and compact design. Control button 36 is located in housing cover 12 such that it is protected and user-friendly. It includes a control button lower part 38 and a control button cap 39 that overlaps a collar 121 formed on housing cover 12. Control button lower part 38 is inserted in a multi-step bore encompassed by collar 21 and secured to the underside of control button cap 39. Control button lower part 38 includes an eccentric pin 40 that extends at a right angle from the underside of control button lower part 38, and a switching ramp 41 that is located on the underside of control button lower part 38, extends in the circumferential direction of control button lower part 38, thereby rising in the direction of the rotational axis of control button 36, i.e., downward in FIG. 1.

Figure 9:
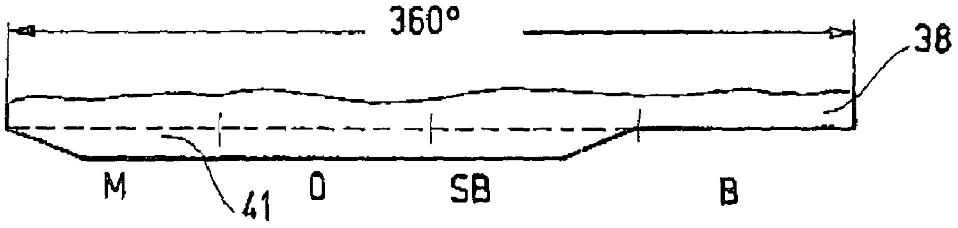
FIG. 9 shows a profile of the control button lower part with switching ramp for actuating a vertical separating slide of the operating mode change-over switch in FIG. 1.

Switching mechanism 37 also includes separating slide 24 mentioned above; the separating slide is guided in housing 10 in a vertically displaceable manner and bears with a U-bent slide end 241 on the underside of control button lower part 38 or switching ramp 41, and, with its other U-bent slide end 242, it overlaps gear wheel 21 that forms the displaceable coupling part of the coupling in the drive chain of air cushion striking tool 14. Upper slide end 241 is pressed by a spring 41 shown only schematically in FIG. 1 against the underside of control button lower part 38 and/or against switching ramp 41, whereby the spring force of spring 42 is greater than the spring force of coupling spring 23, so that, in the range of rotation of control button lower part 38 in which upper slide end 241 leaves switching ramp 41, gear wheel 21 is slid upwardly by spring 42 and lower lever end 242—while tensioning coupling spring 23 in FIG. 1—so far that toothed connection 25 between crank wheel 18 and gear wheel 21 is released, the coupling in the drive chain of air cushion striking tool 14 is therefore opened and striking tool 14 is turned off. As illustrated in the profile of switching ramp 41 in FIG. 9, the switching ramp extends across an approximately 270° circumferential angle of control button lower part 38, so that separating slide 24 is released to be displaced by spring 42 only in a range of rotation of approximately 90° of control button 36.

Figure 2:
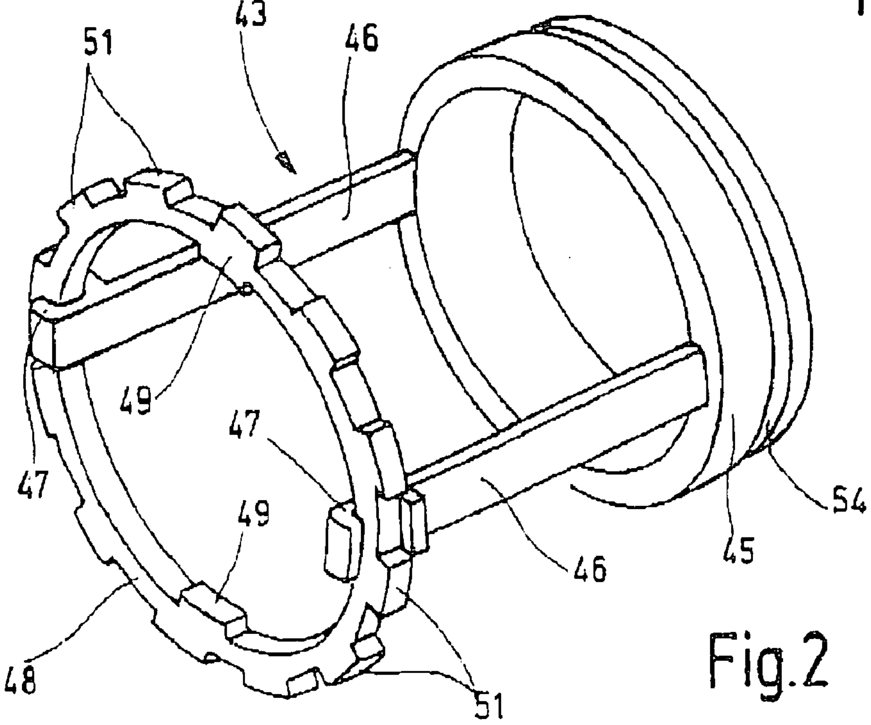
FIG. 2 shows a perspective drawing of a switching element of the operating mode change-over switch in FIG. 1.
Figure 3:
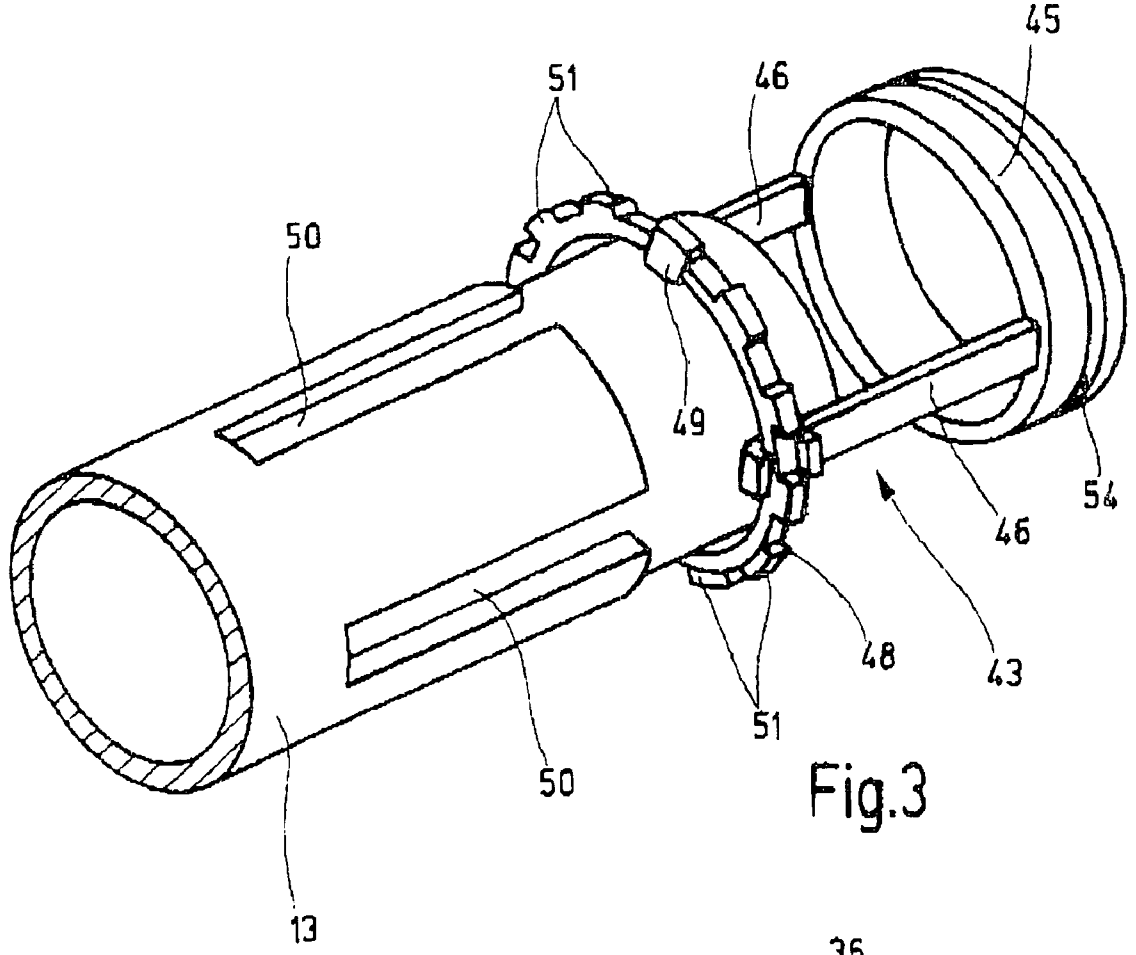
FIG. 3 shows the switching element according to FIG. 2, in a perspective drawing, the switching element having been partially extracted from a hammer tube of the drilling hammer.

Switching mechanism 37 also includes a switching element 43 slid onto hammer tube 13, which is shown in a perspective drawing in FIGS. 2 and 3, and a shift fork 44 that connects switching element 43 to control button 36. Switching element 43 is composed of a coupling ring 45 made of plastic, from which two diametrally located cantilevers 46 integral with coupling ring 45 extend axially. Each cantilever 46 is provided with a recess 47 on its free end opposite the ring and are pretensioned outwardly in the radial direction of coupling ring 45. When the two cantilevers 46 are pressed together, an actuator ring 48 can be inserted into recesses 47, the actuator ring being composed preferably of metal. On its inside facing hammer tube 13, actuator ring 48 includes two diametrally located, radially projecting guide splines 49 that are positioned in corresponding guide grooves 50 recessed in the outside of hammer tube 13. Two further guide grooves 50 are recessed in hammer tube 13. each of which accommodates one of the two cantilevers 46. The dimensions of cantilevers 46 and guide splines 49 are preferably the same, so that all four guide grooves 50 can be configured identically. On its outside facing away from hammer tube 13, actuator ring 48 includes a plurality of equidistantly spaced, radially projecting locking splines 51 that are configured such that they can be inserted axially in corresponding axial recesses 52 on the underside of ring gear 31 facing hammer tube 13. A locking part 53 in the housing is diametrically opposed to the insertion openings of axial recesses 52 in ring gear 31, the locking teeth of which are configured such that locking splines 51 can be inserted axially into locking part 53 and can be positioned in a form-locked manner in the direction of rotation. Locking part 53 is located with axial clearance from axial recesses 52 in ring gear 31 such that, once actuator ring 48 slides out of ring gear 31, actuator ring 48 can still assume a position in which its locking splines 51 do not yet engage in locking part 53. In this "neutral" or "zero" position of actuator ring 48, hammer tube 13 is not coupled to ring gear 31 or locking part 53 in the housing, enabling hammer tube 13 to rotate freely. Coupling ring 45 includes a recess or an annular groove 54 into which a radially directed projection 55 of shift fork 44 engages.

Figure 5:
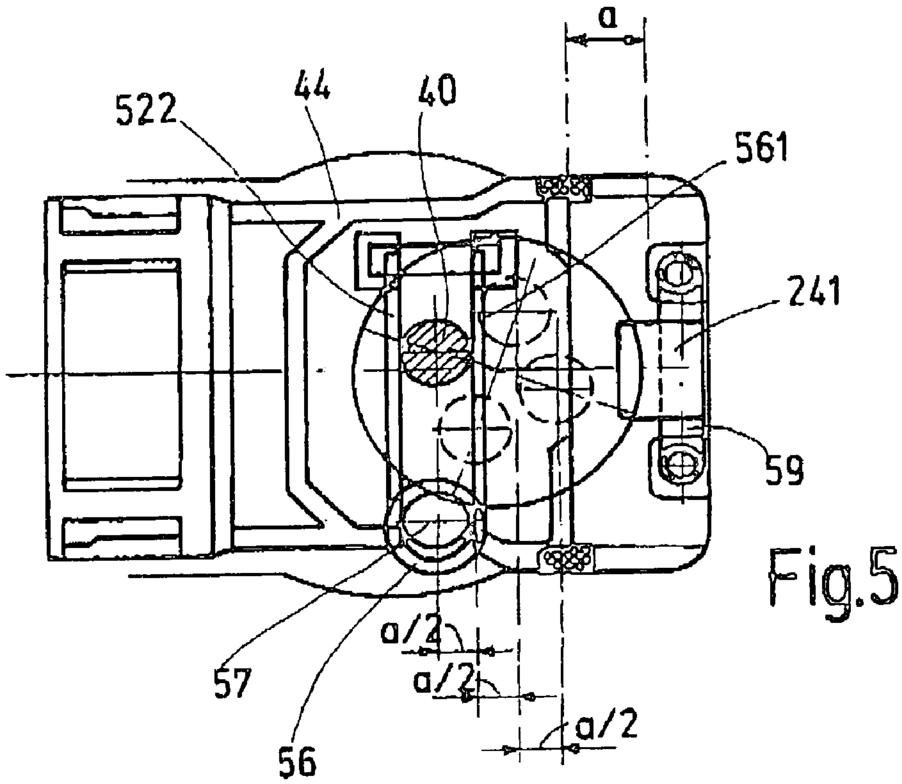

Flat shift fork 44, which is shown in a sectional view in FIG. 1 and a top view in FIGS. 5 through 8 and is preferably made of plastic, extends with its free end on which the projection is located over hammer tube 13 to annular groove 54 in coupling ring 45; it turns downward at the end of hammer tube 13 and extends underneath control button lower part 38. The coupling of shift fork 44 to control button 36 takes place via a synchronizing spring 56 and eccentric pin 40 on control button lower part 38. Synchronizing spring 56 is configured as a coil spring with long legs 561, 562 U-bent at a right angle to the spring axis, the spring being slid onto a bolt 57 projecting upward at a right angle from shift fork 44 and bearing with its two long legs 561 and 562 on diametral points of eccentric pin 40 in a non-positive manner, the points nearly aligning with each other in the sliding direction of shift fork 44 (FIGS. 5 through 8). Eccentric pin 40 is located on control button lower part 38 at an angle α relative to the longitudinal axis of shift fork 44 such that, when control button 36 rotates by 90°, four rotated positions of eccentric pin 40 result, each being offset from the other by a distance a/2 as viewed in the sliding direction of shift fork 44, as shown in FIG. 5. The overall displacement travel of shift fork 44 is a, after which shift fork 44 bears against a stop 59 in the housing. The upper slide end 241 of separating slide 24 is shown in the illustrations in FIGS. 5 through 8, the slide end extending past the underside of control button lower part 38 and bearing on switching ramp 41 across a circumferential angle of nearly 270°.

Figure 4:
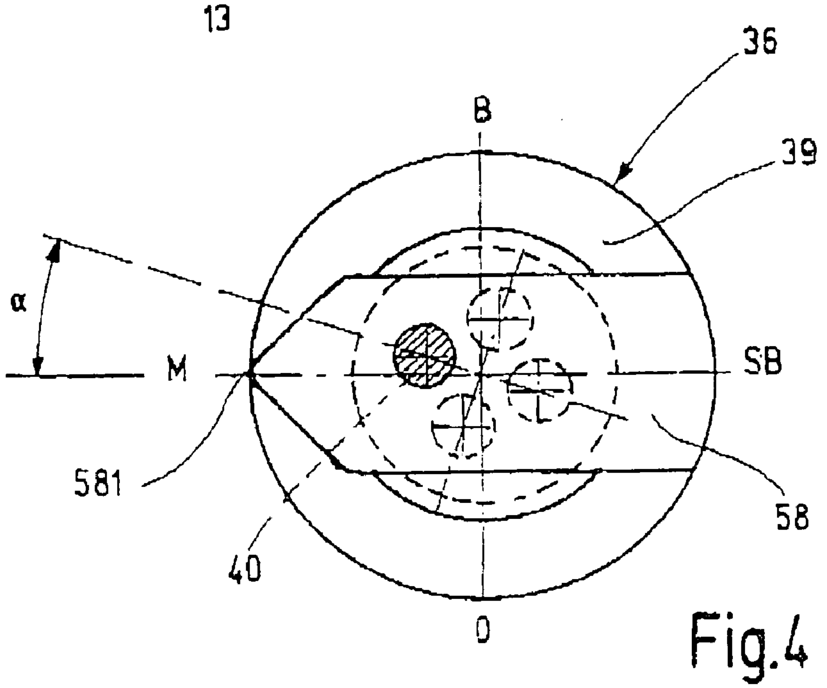
FIG. 4 shows a top view of a control button of the operating mode change-over switch in FIG. 1, FIG. 5 through 8 show a top view of a control button lower part and a coupled shift fork of the operating mode change-over switch in FIG. 1 in four different setting positions of the control button.

Control button cap 39 is shown in a top view in FIG. 4. It includes a gripping segment 58 on which a marking tip 581 is configured. Marking tip 581 indicates the setting position of control button 36, that is, the "chiseling" mode (M), the "impact drilling" mode (S), and the "drilling" mode (B), which are set by operating mode change-over switch 35. In addition, a "neutral" or "zero" position (0) is provided, in which only the air cushion striking tool 14 is active but not the rotary drive for hammer tube 13, and hammer tube 13 can rotate freely and at random in housing 10.

The mode of operation of operating mode change-over switch 35 is as follows:

If control button 36 is set, as shown in FIG. 4, such that marking tip 581 points to position M, shift fork 44 is displaced furthest to the left in FIG. 1 along the maximum displacement travel a, as shown in FIG. 5. Accordingly, switching element 43 is displaced by shift fork 44 as far to the left as possible; as a result, actuator ring 48 with its locking splines 51 is pressed into locking part 53 in the housing. Hammer tube 13 is fixed in housing 10 in a torsion-proof manner by the torsion-proof connection of actuator ring 48 with hammer tube 13 via guide splines 49, cantilevers 46 and guide grooves 50, and there is no connection between hammer tube 13 and ring gear 31. When electric motor 27 is turned on, freely rotating ring gear 31 and air cushion striking tool 14 are driven by gear unit 30, since separating slide 24 bears with its upper slide end 241 on switching ramp 41 and, as shown in FIG. 1, is displaced downward so that coupling spring 23 holds the coupling between crank wheel 18 and gear wheel 21 closed. Since only air cushion striker train 14 is activated, the tool is driven only by air cushion striker train 14 with an axial striking motion.

Figure 6:
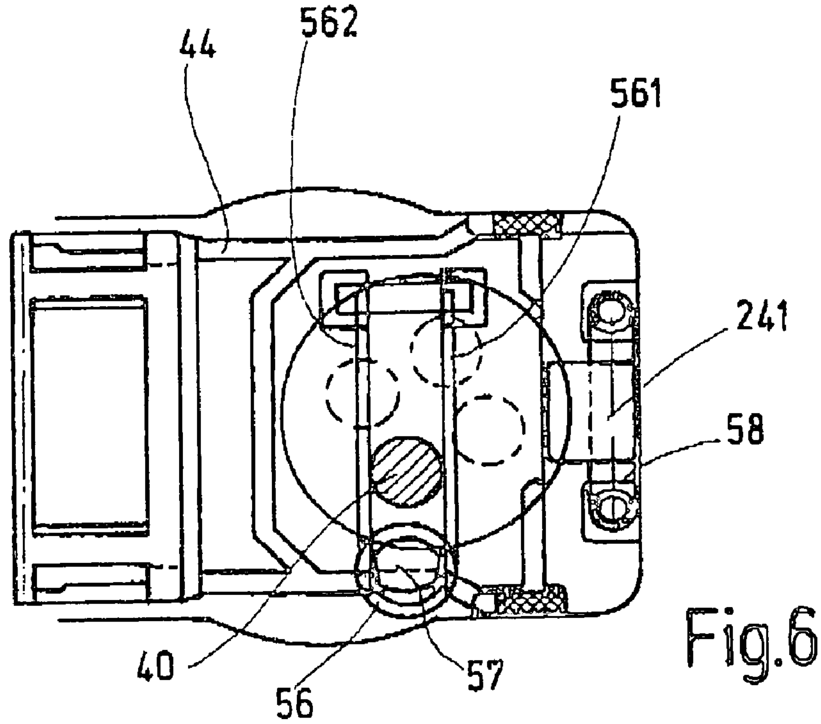

If control button 36 is turned out of position M into position 0 by 90° in FIG. 4 in the counter-clockwise direction, shift fork 44 is displaced by eccentric pin 40 and synchronizing spring 56—as shown in FIG. 6—to the right along displacement travel a/2 in FIG. 1. Switching member 43 in FIG. 1 is displaced to the right along the same displacement path by coupling ring 45; as a result, locking splines 51 on actuator ring 46 disengage from locking part 53, and actuator ring 48—as shown in FIG. 1—assumes a central position between locking part 53 and ring gear 31. Hammer tube 13 is released to rotate freely, but is not started rotating by electric motor 27. Air cushion striking tool 14 remains activated, since separating slide 24 is also held in this rotational position of control button 36 by switching ramp 41 in the position shown in FIG. 1.

Figure 7:
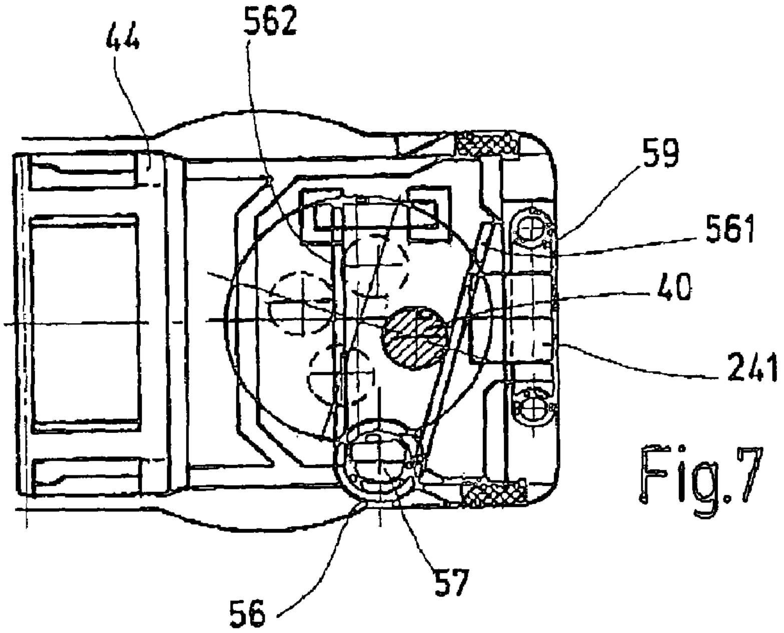
Figure 8:
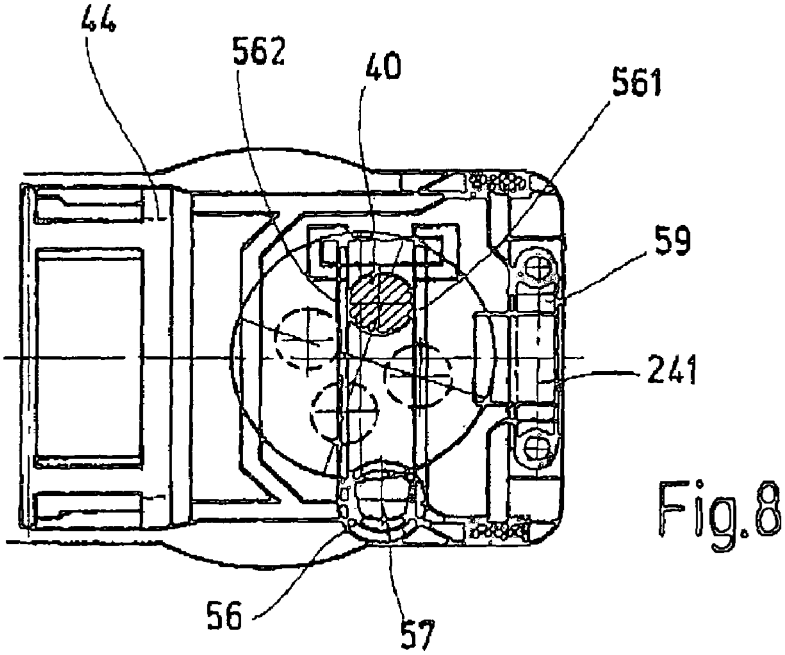

If control button 36 is turned to control button position SB, shift fork 44 is displaced to the right along displacement path a/2 in FIG. 1 and, after eccentric pin 40 covers half of the rotation path, it contacts stop 59 in the housing. Eccentric pin 40, which moves further, deflects spring leg 561 of synchronizing spring 56 (FIG. 7). Shift fork 44, which is being displaced by the distance a/2, pushes actuator ring 48 in FIG. 1 so far to the right that locking splines 51 slide into axial recesses 52 in ring gear 31 in a form-locked manner and therefore connect hammer tube 13 to ring gear 31 in a torsion-proof manner. Electric motor 27 now brings hammer tube 13 and, therefore, the tool holder and the tool retained in the tool holder in a torsion-proof manner into rotation. Air cushion striking tool 14 remains activated, since upper slide end 241 of separating slide 24 has not yet left switching ramp 41 (refer to position SB in FIG. 9).

If control button 36 is now turned further by 90° into setting position B, eccentric pin 40 returns along rotation distance a/2. Since eccentric pin 40 in setting position SB had previously moved rotation distance a (FIG. 7) given a displacement travel of shift fork 44 by a/2 while deflecting spring leg 561, this return of eccentric pin 40 does not cause shift fork 44 to become displaced. Actuator ring 48 therefore retains its engaged position in ring gear 31. As a result of the rotation of control button lower part 38 around this further 90°, switching ramp 41 has slid out of the region of the upper lever end 241 of separating slide 24, so that separating slide 24 is pushed upward by spring 42 in FIG. 1 until it bears against the switching ramp-free region of control button lower part 38 and, thereby, its lower lever end 242 pushes gear wheel 21 upward while pressing coupling spring 23 together, so that the external teeth between gear wheel 21 and bearing tube 181 of crank wheel 18 become disengaged and the coupling in the drive chain of air cushion striking tool 14 is opened. Air cushion striking tool 14 is therefore decoupled from electric motor 27 and, finally, hammer tube 13 is started rotating by electric motor 27. Pure drilling work can now be carried out with the tool retained in the tool holder in a torsion-proof manner.

It is possible, of course, to turn control button 36 out of its setting position M in the opposite direction of rotation directly into setting position B and then, from here, further to setting position SB and then 0. Nothing about the mode of operation of switching mechanism 37 changes as a result.

What is claimed is:

1. A drilling hammer comprising a hammer tube (13) that is rotatably supported in a housing (10), the hammer tube being rotationally driveable by a driven wheel (31) of a gear unit (30) sitting on the hammer tube (13), with a striking tool (14) located in the hammer tube (13), the striking tool including a piston (15) that can be driven with a reciprocating motion, and an operating mode change-over switch (35) for the "impact drilling" and "chiseling" operating modes, the operating mode change-over switch including a manually actuatable control button (36) and a switching mechanism (37) connected with the control button (36), the switching mechanism coupling the hammer tube (13) to the driven wheel (31) when in the "impact drilling" operating mode of the control button (36) and fixing the hammer tube in a non-rotative manner in the housing (10) when in the "chiseling" operating mode, wherein the switching mechanism (37) includes an actuator ring (45) fixed on the hammer tube (13) in an axially displaceable and torsion-proof manner, the actuator ring including at least one radially projecting locking spline (51) on its outer side facing away from the hammer tube (13), the locking spline being designed to slide in an axial direction direction in a form-locked manner into at least one axial recess (52) in the driven wheel (31) and into locking toothing (53) in the housing, and wherein, to fix the actuator ring (48) in a torsion-proof and axially displaceable manner on the hammer tube (13), the actuator ring (48) includes at least one radially projecting guide spline (49) on an inner side facing the hammer tube (13), and the hammer tube (13) includes at least one axial guide groove (50) on an outer side facing the actuator ring (48), in which the guide spline (49) is situated in the circumferential direction in a form-locked manner.

2. The drilling hammer as recited in claim 1, wherein the actuator ring (48) is located on the side of the driven wheel (31) facing away from the control button (36) and is connected—underneath and past the driven wheel (31)—with a coupling ring (45) slid onto the hammer tube (13) on the other side of the driven wheel (31), the coupling ring being coupled to the control button (36) such that actuating the control button brings about an axial displacement of the actuator ring (48).

3. The drilling hammer as recited in claim 2, wherein the connection between the actuator ring (48) and coupling ring (45) is created using at least two cantilevers (46) projecting axially outwardly from the coupling ring (45).

4. The drilling hammer as recited in claim 3, wherein the cantilevers (46) are axially displaceable and are accommodated in the circumferential direction of the hammer tube (13) in axial grooves (50) in the hammer tube (13) in a form-locked manner.

5. The drilling hammer as recited in claim 2, wherein the cantilevers (46) are integrally molded on the coupling ring (45) and the actuator ring (48) is accommodated in recesses (47) that are formed close to the end of the cantilevers (46) furthest away from the coupling ring in the outer side of the cantilevers (46) facing away from the hammer tube (13).

6. The drilling hammer as recited in claim 2, wherein an annular groove (54) is formed in the outside of the coupling ring (45), in which a radially directed projection (55) of a shift fork (44) coupled with the control button (36) is displaceably guided.

7. The drilling hammer as recited in claim 6, wherein the control button (36) is fixed in the housing (10) such that it is pivotable around a rotation axis, and the shift fork (44) is coupled via a synchronizing spring (56) to an eccentric pin (40) extending out of the control button (36) and positioned with radial clearance from the axis of rotation.

8. The drilling hammer as recited in claim 7, wherein the synchronizing spring (56) is a coil spring with long legs (561, 562) bent at a right angle to the spring axis, and the synchronizing spring (56) is mounted on a bolt (57) formed on the shift fork (44) and bears, in a non-positive manner, with both of its legs (561, 562) on diametral points of the eccentric pin (40) opposite each other in the sliding direction of the shift fork (44).

9. The drilling hammer as recited in claim 1, wherein a setting position is assigned to the control button (36), in which the displacement position of the actuator ring (48) of the switching mechanism (37) is set such that the actuator ring (48) is neither in torsion-proof engagement with the driven wheel (31) nor in torsion-proof engagement with the housing (10).

10. The drilling hammer as recited in claim 1, wherein the control button (36) has a selling position for the "drilling" operating mode in which the striking tool (14) is decoupled, and the striking tool (14) is decoupled by a sliding motion of a switching mechanism part (37) that is triggered by the control button (36) and travels at a right angle to the hammer tube (13).

11. The drilling hammer as recited in claim 10, wherein a coupling with two coupling parts held in engagement with each other by a coupling spring (23) is located in the drive chain for the striking tool (14); one of the coupling parts is configured such that it can be displaced against the force of the coupling spring (23) by the switching mechanism part actuated by the control button (36).

12. The drilling hammer as recited in claim 11, wherein a switching ramp (41) is fom,ed on the control button (36), which rises in the rotational direction of the control button (36) at a right angle to the underside of the control button (36), and the switching mechanism part is a separating slide (24) guided in an axially sliding manner, that bears against the switching ramp (41) in a non-positive manner and against the displaceable coupling part.

13. The drilling hammer as recited in claim 12, wherein the non-positive connection between the separating slide (24) and the coupling part, and between the separating slide (24) and the switching ramp (41) is established by a spring (42) acting on the separating slide (24), the spring force of which is greater than the coupling spring force of said coupling spring (23), directed against said spring force of said spring (42).

14. The drilling hammer as recited in claim 11, wherein the drive chain for the striking tool (14) includes a crank wheel (18) of a crank driving mechanism (16) engaging in the piston (15) of the striking tool (14), and a gearwheel (21) that meshes with a drive pinion (28) driven by an electric motor (27), the crank wheel (18) and the gearwheel (21) form the coupling parts that are engaged with each other via axial toothing (25), and the coupling spring (23) is configured as a compression spring that bears axially between the crank wheel (18) and the gearwheel (21).

* * * * *